United States Patent
Cummings

[15] 3,669,900
[45] June 13, 1972

[54] METHOD AND APPARATUS FOR CONTINUOUS PRODUCTION OF OIL-IN-WATER EMULSIONS

[72] Inventor: Lowell O. Cummings, San Anselmo, Calif.
[73] Assignee: Pacific Vegetable Oil Corporation, San Francisco, Calif.
[22] Filed: May 2, 1969
[21] Appl. No.: 821,235

[52] U.S. Cl. .............................. 252/359 C, 259/102, 259/85
[51] Int. Cl. ........................... B01d, B01f 9/08, B01f 7/00
[58] Field of Search ............... 159/1 C, 25 A; 252/359 C; 259/84, 85, 102; 23/272.6, 272.7, 272.8; 99/348

[56] References Cited

UNITED STATES PATENTS

| | | | |
|---|---|---|---|
| 2,006,085 | 6/1935 | Lehmkuhl | 23/272.7 X |
| 2,651,582 | 9/1953 | Courtney | 259/85 X |
| 2,879,143 | 3/1959 | Thurman | 23/272.8 |
| 1,600,948 | 9/1926 | Poore | 252/359 R |
| 1,722,433 | 7/1929 | Kirschbraun | 252/359 R |
| 1,733,497 | 10/1929 | Kirschbraun | 252/359 R |
| 1,787,339 | 12/1930 | Clapp | 252/359 C |

FOREIGN PATENTS OR APPLICATIONS

| | | | |
|---|---|---|---|
| 16,927 | 7/1929 | Australia | 259/84 |
| 417,554 | 11/1910 | France | 252/359 C |

*Primary Examiner*—Norman Yudkoff
*Assistant Examiner*—J. Sofer
*Attorney*—Owen, Wickersham & Erickson and Everett G. Clements

[57] ABSTRACT

A system and device for producing an oil-in-water emulsion of high water-insoluble liquid content, e.g., containing 70 percent to about 95 percent of such liquid or oil. An initial receptacle receives streams of oil, water, and emulsifying agent, while beater means subdivides the oil component and forms such oil-in-water emulsion. An exit portion or chamber and an aperture therein are connected by a conduit to a second or dilution receptable, wherein predetermined amounts of dilution water are introduced and thoroughly admixed with the emulsion. The continuous process for forming such an emulsion includes effecting with the beater a thin, continuous water phase around very small particles of oil, continuously withdrawing a primary thick emulsion to a dilution zone, and continuously diluting it to a desired water or dilution liquid content.

5 Claims, 4 Drawing Figures

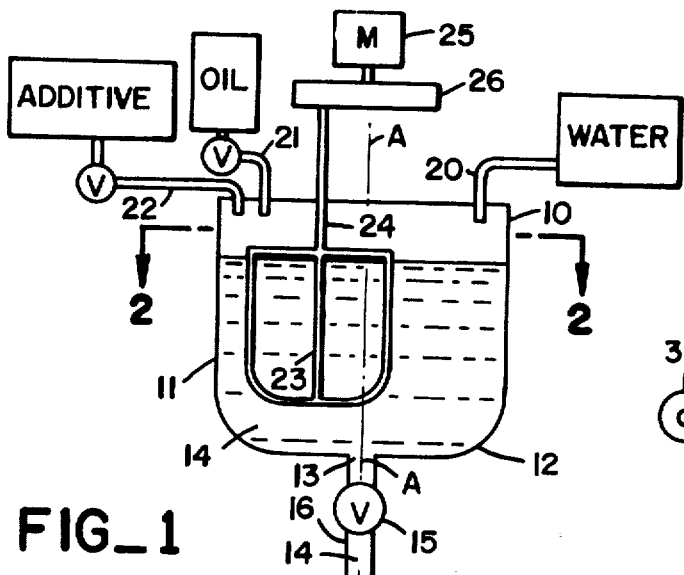
FIG_1
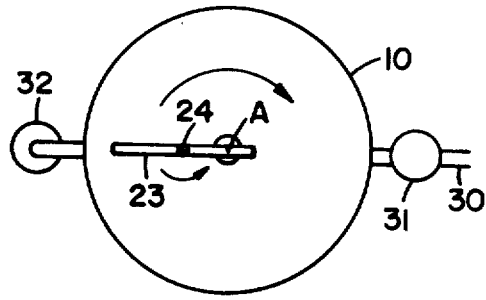
FIG_2
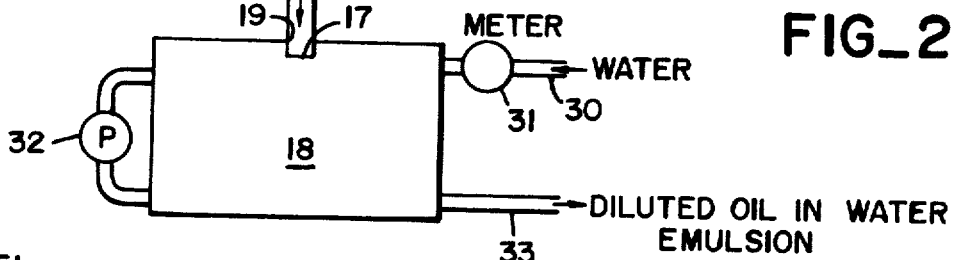
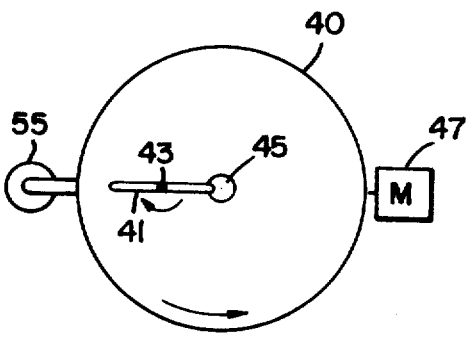
FIG_4
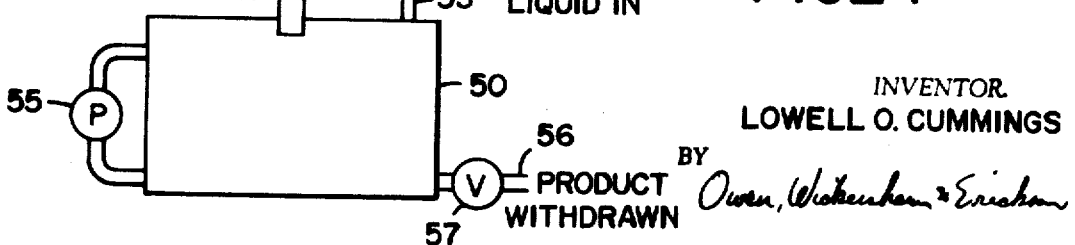
FIG_3
INVENTOR.
LOWELL O. CUMMINGS
BY Owen, Wickersham & Erickson
ATTORNEYS

METHOD AND APPARATUS FOR CONTINUOUS PRODUCTION OF OIL-IN-WATER EMULSIONS

This invention relates to a system, method, and apparatus for the production in a continuous manner of emulsion of the oil-in-water type, i.e., wherein water is the continuous phase, especially wherein water is present in the primary concentrated or thick emulsion in a minor amount or in an amount of not over 20 percent by weight.

A primary thick emulsion of this type made from drying oils and their alkyds has been described, for instance in U. S. Pat. No. 3,266,922, issued August 16, 1966, in the names of Lowell O. Cummings and John A. Kneeland. However, there has been a need for a device and system to enable economic continuous production of many such emulsions, especially as diluted to useful embodiments, for employment, for instance, in the painting or coating industry or art. The present invention provides such a system and such a device.

The apparatus of the invention provides an initial receptacle for the components to be emulsified, suitable inlet means for each component or admixture of components, and one or more beaters within the receptacle. The beater extends a major portion of the length of the receptacle and in width is from about one-eighth to three-fourths of the diameter of the receptacle so that it is adapted to beat and smash later-added liquid components and to reduce a water-insoluble component to small droplets of not over 10 microns in diameter and dispersed in the water phase. The receptacle has side walls and a base wall and is provided with an aperture in its base wall or in a wall at a location remote from the above-mentioned inlet means. Sealed to the wall about the aperture is an outlet conduit for the formed emulsion, which resembles mayonnaise in appearance. The outlet conduit is provided with an adjustable valve to regulate product outflow, and this conduit debouches into a second receptacle or dilution chamber. The dilution chamber is provided with an inlet and with meter means for introduction of dilution water at a requisite rate to adjust the solids content of the emulsion to some desired level, e.g., of from over 50 percent to about 65 percent, for paints. An agitator or mixing means is also provided in the dilution chamber, advantageously being a positive displacement pump, to form a uniform dilute emulsion. Finally, withdrawal means is provided to conduct the dilute emulsion to storage or to sales containers, or otherwise as desired.

In carrying out the process of this invention, a predetermined major amount of a water-insoluble liquid or oil, suitably from about 70 percent to about 95 percent of the total of the initial ingredients, is charged to a mixing zone, into which is also fed a small amount of at least one emulsifier or emulsifying agent sufficient to effect stable emulsification in this process of such water-insoluble liquid in water. Water forms the remainder of the mix and is also charged at the inlet to the mixing zone. The emulsifier may also be added admixed with the oil phase, or with the water phase.

The water-insoluble liquid can be a bodied glyceride drying oil, e.g., a vegetable or a fish oil which has been heat-bodied or air-blown; or it can be an epoxy resin, styrene, polybutene resin, an alkyd resin made from a drying glyceride oil and glyceryl phthalate in the known way, or an adduct of an unsaturated glyceride oil and maleic anhydride. (As is known, by an "epoxy resin" is meant a condensation product of epichlorohydrin and bisphenol A). Compatible admixtures of the water-insoluble liquids with each other are also useful in this invention. There are employed water-insoluble components which are liquid at normal or room temperatures or which are liquefiable at slightly elevated temperatures, e.g., up to less than the boiling point of water.

The emulsifier employed herein is water-soluble and can be of a nonionic or of ionic type. Some useful emulsifiers have been found to be nonyl phenoxypoly (ethyleneoxy) ethanol, e.g., having from 10 to 100 moles ethylene oxide per molecule, such as a 70 percent solution in water of nonyl phenoxypoly (ethyleneoxy) ethanol having 30 moles ethylene oxide per molecule; a 28 percent solution in water of the sodium salt of sulfated nonyl phenoxypoly (ethyleneoxy) ethanol; nonyl phenyl polyethylene glycol ether containing 10.5 moles of ethylene oxide. More than one of the emulsifiers can be used, if desired.

In preparing the emulsion, the water-insoluble liquid described, the water, and the emulsifying agent or emulsifier are fed to a mixing zone, suitably without splashing, and the mixed components are then subjected to a suitable beating action which is effected, for instance, by a planetary beater as described herein. It has been found essential that this beating action be effected in order, apparently, to drive layers of the water phase into the oil phase or water-insoluble liquid, forming a continuous water phase membrane around very small dispersed droplets of the water-insoluble liquid, while enabling continuous production of the desired concentrated emulsion and withdrawal of this thereof from the emulsifying zone to a dilution zone for dilution of the concentrate to the desired water content. The action of the beater results in particle sizes in the dispersed phase of not over 10 microns in diameter, usually from about 0.5 to 2 microns in diameter, the particle size being measured by microscopic examination, using a scale in the microscopic calibrated in microns.

The formation of a concentrate is a vital first step in making the final emulsion of this invention. This concentrate is an oil-in-water emulsion which has a general consistency and general appearance of the common mayonnaise found in food stores. The special rheological properties of the concentrate of this invention are due to particles of oil (or other water-insoluble liquid) which are surrounded by a thin layer of water or water solution. This configuration produces a strange behavior resembling that of mayonnaise. When the concentrate is undisturbed, it retains its general shape and does not tend to flow. It holds almost any shape it has been formed in. If an object is drawn over its surface, a track will be left, and the track will not flow back to give a smooth surface, even though the force needed to make the track is small. It does not yield or change shape until a certain small critical amount of force is reached, and then it yields more or less as if it were a Newtonian liquid. The force of gravity is not enough to cause flow, yet it is easily deformed. This type of behavior is called plastic flow. It is caused by more or less evenly sized particles, all of which are surrounded by a watery membrane. At rest, these particles fit together in layers in the same manner as is observed in stacked marbles or shot. When disturbed, the layers of particles slip over one another but then fit together again when undisturbed.

The products of the present invention are particularly useful as vehicles for paints or coatings, and they are useful for other purposes. The undiluted concentrate from the emulsifying zone has the properties shown by the following tests:

1. Plastic flow: visual testing determines whether the emulsion has plastic flow, by observing that the material does not flow when undisturbed but will move readily in an area in which a force is applied. Typical of this is the permanent track left on the surface when an object is drawn across the surface.

2. Low electrical resistance: the electrical resistance of the emulsion may be measured with electrodes spaced 1-½ inches apart: the oil-in-water concentrate emulsions having average particle sizes between one and three microns had a resistance in the range of 10 to 60 kilohms, while water-in-oil emulsions of similar chemical makeup had resistances in the range of 10 to 100 megohms - a 1,000 times and more as great.

3. Dispersibility of the emulsion in water: an oil-in-water emulsion concentrate of this invention will steadily and completely disperse in water, even when left in the water without agitation. Under the same conditions, a water-in-oil emulsion will never disperse in water.

Other objects and advantages and features of the invention will appear from the following description of some preferred embodiments.

In the drawings:

FIG. 1 is a schematic view in vertical section of a system and device embodying the principles of the invention.

FIG. 2 is a view in horizontal section taken on the line 2 — 2 in FIG. 1.

FIG. 3 is a schematic view in vertical section of a modified system and device also embodying the principles of the invention.

FIG. 4 is a plan view of the device and system of FIG. 3 taken on line 4 — 4 in FIG. 3, showing the relative arrangement and motion of the beater and the receptacle.

Some modes of carrying out the present invention are illustrated in the accompanying drawings and in the examples given below. Other modes will suggest themselves to those skilled in this art.

In FIG. 1 a receptacle 10, advantageously of circular cross-section and having a central axis A, has a side wall 11 and a bottom wall 12, which suitably slopes generally downward toward the central axis A. An aperture 13 at the central portion of the wall 12 provides for outflow of the emulsified concentrate product 14. An adjustable valve 15, such as a gate valve, may be disposed below the aperture 13 in an outlet conduit 16, which is suitably sealed to the bottom wall 12, in the form of the device shown in FIG. 1. The conduit 16 debouches at an outlet 17 into a second receptacle 18, through an aperture 19. The receptacle 18 is a dilution chamber and is of any desired configuration.

The receptacle 10 is also provided with an inlet conduit 20 for water, an inlet conduit 21 for oil or other water-immiscible liquid and, if desired, a third inlet conduit 22, for an emulsifying agent, flavorings or other additives. In one suitable system, however, the two inlet conduits 20 and 21 suffice, and the emulsifying agent or other additive (or both) is pre-mixed with the water or with the oil and introduced into receptacle 10 in a pre-mixed state.

Disposed within the receptacle 10 is at least one beater 23, which is rotatable on its own axis and which also revolves about the central axis A of container 10; in other words, it operates in planetary motion. The beater 23 is attached to and suspended by an arm 24 which is connected to a motor 25 that effects the planetary motion through gears 26, shown schematically. Such planetary gears 26 are well known in the mixer art and need not be specifically described. The motor 25 and gears 26 are in suitable housings in the usual manner.

At its outlet end 17, the conduit 16, which conducts the finished emulsion away from the receptacle 10, debouches into the second receptacle 18 through the aperture 19 in its end wall, the receptacle 18 being also a dilution chamber. The chamber 18 is provided with an inlet 30 for dilution liquid, such as water, which in one embodiment is suitably disposed near the outlet end 17 of the conduit 16. The incoming dilution liquid may be suitably metered at 31 to provide the proper dilution of the concentrated emulsion. The chamber 18 is also provided, in one embodiment, with a circulating pump 32, which may be a positive displacement pump such as a Viking pump and which disperses the incoming thick oil-in-water emulsion throughout the dilution liquid to form the desired dilute emulsion, also of oil-in-water character. The diluted emulsion is withdrawn through an outlet conduit 33, either to use or to a storage tank where it can be held or from which it can be charged into unit containers as desired.

FIG. 2, a sectional view of the assembly of FIG. 1, taken on line 2—2 thereof, shows particularly the relative arrangements of the receptacle 10 and its beater 23 and suggests the rotation of the beater 23 about its arm 24 and then revolution of the arm 24 about the axis A.

Another embodiment of the invention is shown in FIG. 3. Here a receptacle 40 has disposed within it a beater paddle 41. The beater 41 is connected to a source of power 42 by an axial rod 43 and in operation is caused to rotate about its own axis.

The receptacle 40 is provided with a gear 44 adjacent its outlet 45 in the base 46 of the receptacle 40, and the gear 44 is connected to a source of power 47 which operates the gear 44 to cause the receptacle 40 to rotate on its own vertical axis, so that the beater 41 and the receptacle 40 are each caused to rotate independently in such a manner that, in effect, relative planetary motion is attained. The two rotating elements 40, 41 may sometimes rotate in opposite directions, as shown in FIG. 4, but it will be understood that they can alternatively rotate in the same direction.

In the system or assembly shown in FIG. 3, an adjustable valve 48 is disposed in an outlet conduit 49, connected to the receptacle 40 at its aperture 45; and the outlet end of conduit 49 is disposed within a dilution receptacle 50, which may be free to rotate with the receptacle 40, or the conduit 49 can, alternatively, be sealed to the receptacle 40 through a connection permitting relative rotation of receptacle 40 with respect to the outlet conduit 49 in any desired manner.

The receptacle is provided with inlet means 51 for oil or other water-immiscible liquid and an inlet 52 for water, the emulsifier being previously dissolved in one or the other of the water or oil. The dilution chamber 50 is also provided with suitable inlet means 53 for introducing pre-determined amounts of dilution liquid, usually water, as through a meter 54, means for mixing the dilution liquid with incoming oil-in-water emulsion such as a positive displacement pump 55, and outlet means 56 for withdrawing diluted product, as through an adjustable valve 57, to use or storage.

Some specific examples are given below to illustrate modes of carrying out the present invention in a device as shown in FIG. 1 and 2.

EXAMPLE 1

There are charged to the receptacle 10 components in a ratio of 87 percent by weight of heat-bodied safflower oil having a Gardner-Holdt viscosity of $Z_8$, 5 percent of nonyl phenyl polyethylene glycol ether containing 10.5 moles of ethylene oxide as nonionic emulsifier and 8 percent water, and the admixture is emulsified by beating with the planetary beater 23, which rotates at high speed on its axis in the direction of the small arrow in FIG. 2 and revolves about axis A of receptacle 10 in a direction opposite to its rotation as shown by the arrow of revolution and by FIG. 2. The emulsion so formed is forced downwardly into the exit zone 14 and on out through the aperture 13, valve 15, and conduit 16, its rate of flow being controlled as desired by setting the valve 15 accordingly. The thick emulsion concentrate flows into the chamber 18, and the desired amount of water is metered in at the inlet 30 and meter 31 to provide a nonvolatile content of 65 percent. The pump 32 is started and circulates the emulsion-water mix to form very rapidly a uniform, diluted emulsion which is drawn off at the outlet conduit 33. If desired, a fungicide or anti-freeze agent or both can also be incorporated in the diluted emulsion, which has an oil particle or droplet average size of about 1 micron and is useful as a paint vehicle.

FURTHER EXAMPLES

Table 1 below shows a number of other examples of operating the present invention wherein there are varied the starting water-insoluble liquid component, the emulsifying agent and the relative amount of all components. It will be noted that the average particle sizes of the ultimate insoluble liquid particles are in these examples not over 2 microns and in Example 7 the average size is less than 0.5 microns. The initial emulsion or mayonnaise is diluted in the dilution step to about 65 to 40 percent nonaqueous content, or, in other words, about 35 to 60 percent water.

TABLE 1

| Oil, resin etc. | | Amount, wt. percent | Water, wt. percent | Emulsifier | Emuls. amt., wt. percent | Aver. particle size (microns), product |
|---|---|---|---|---|---|---|
| Example No.: | | | | | | |
| 2 | Alkyd of 64% soy oil plus 36% glyceryl phthalate. | 52.2 | 9.4 | Tergitol NPX | 1.2 | 1 |
| | | | | Igepal C0887 | 1.2 | |
| | Styrene, monomeric, visc. 1 poise. | 34.8 | | Alipal C0443 | 1.2 | |
| Total | | | | | 3.6 | |
| 3 | Alkyd of 55% safflower oil plus 45% diethylene glycol phthalate. | 43.5 | 9.4 | Same as 2, above | (¹) | 1 |
| | Vinyl acetate visc. 0.5 poise. | 43.5 | | | | |
| 4 | Indopol H-100 (polybutene resin) of Gardner Holdt visc. Z₆ and mol. wt. 830. | 87.0 | 8.7 | Tergitol NPX | 4.3 | ca. 2 |
| 5 | Epon 828 (Epoxy resin, diglycidyl ether of bisphenol A, epoxy equiv. wt. 185-192, visc. 6,500-6,900 cps. | 91 | 4.5 | Igepal C0990 | 4.5 | ca. 1 |
| 6 | Ester made from fatty acids of safflower oil and epoxy resin of epichlorhydrin and bisphenol A having epoxy equiv. wt. 550-700. Very visc. liq. of over Z₁₀ on Gardner scale. | Same as in Example 5, above | | | | ca. 1 |
| 7 | Adduct from safflower oil with 15% maleic anhyd. Gardner visc. Z₁. | 71 | 19 | Tergitol NPX | 4.91 | 0.5 |
| | | | | Igepal C0990 | 4.91 | |
| | | | | Na₂CO₃ | 0.18 | |
| Total | | | | | 10.00 | |

¹ Same as 2, above.

In the above table, Tergitol NPX is nonionic emulsifier, nonyl phenoxypoly (ethyleneoxy) ethanol having 10.5 moles ethylene oxide per molecule; Igepal C0887 is nonionic emulsifier, nonyl phenoxypoly (ethyleneoxy) ethanol having 100 moles ethylene oxide per molecule; and Alipal C0443 is anionic emulsifier, sodium salt of sulfated nonyl phenoxypoly (ethyleneoxy) ethanol, (employed as 28 percent solution in water).

EXAMPLE 8

In still another procedure according to the invention an epoxy fatty acid ester which was semisolid at room temperature was heated to 60° C. to obtain a material having about 300 poise viscosity. This material was fed to a device as described herein (and operated at high speed) along with water and emulsifier within the amounts described elsewhere herein to obtain continuous production and dilution of a concentrate as described. The particle size was controlled to an average of about 1 micron.

It will be understood that variations and modifications can be made herein without departing from the spirit and scope of the invention. Having now described the invention,

What is claimed is:

1. A device for the continuous production of an emulsion consisting essentially of a water-insoluble liquid dispersed in a continuous water phase comprising:
   a cylindrical vertically extending mixing receptacle,
   separate sources of water-insoluble liquid and water,
   separate inlet conduits connecting said sources to said mixing receptacle,
   means for beating the mixture of water-insoluble liquid and water introduced into said mixing receptacle from said sources to reduce said mixture to an average particle size of not over 10 microns in diameter, the particles being droplets of the water-insoluble liquid with a continuous water phase membrane around them, said beating means including a skeleton type beater extending vertically for a major portion of the vertical length of said receptacle, eccentrically positioned in said receptacle, spaced from the side wall, the top and bottom of said receptacle and having a width of one-eighth to three-fourths of the diameter of said receptacle, and means for rotating said beater about its vertical axis and causing a planetary motion of said beater relative to the wall of said mixing receptacle,
   an outlet conduit connected to the bottom of said receptacle collinear with the receptacle axis, said axis of said outlet conduit being stationary during operation of said device,
   and valve means for controlling continuous simultaneous flow in the water insoluble liquid inlet and the outlet conduits to achieve balanced flow conditions for continuous production of said emulsion.

2. The device of claim 1 wherein said receptacle is stationary and the axis of said beater revolves around the axis of said receptacle.

3. The device of claim 1 in which there is a means for rotating said receptacle about its vertical axis.

4. The device of claim 1 in which a second receptacle is associated with said outlet conduit to receive the emulsion,
   a source of diluent water is provided and a metering means connects said source to said second receptacle,
   an outlet conduit is connected to said second receptacle,
   there is a means associated with said second receptacle for mixing the diluent water with said emulsion in said second receptacle,
   and valve means for controlling outlet flow from said second receptacle to achieve balanced flow conditions for continuous production of the diluted emulsion.

5. The device of claim 4 having as said means for mixing a positive displacement circulating pump.

* * * * *